United States Patent [19]
Bronicki

[11] Patent Number: 5,020,328
[45] Date of Patent: Jun. 4, 1991

[54] SILENCER FOR GEOTHERMAL POWER PLANT AND METHOD FOR USING THE SAME

[75] Inventor: Lucien Y. Bronicki, Yavne, Israel

[73] Assignee: Ormat Turbines (1965) Ltd., Yavne, Israel

[21] Appl. No.: 440,204

[22] Filed: Nov. 22, 1989

[51] Int. Cl.$^5$ ............................................. F03G 4/06
[52] U.S. Cl. ..................................... 60/641.5; 165/45
[58] Field of Search ................ 60/641.2, 641.3, 641.4, 60/641.5; 165/45

[56] References Cited

U.S. PATENT DOCUMENTS

| | | | |
|---|---|---|---|
| 4,057,964 | 11/1977 | Hutchinson | 60/641.5 |
| 4,187,087 | 2/1980 | Whitescarver | 55/43 |
| 4,596,307 | 6/1986 | Challis | 181/239 |
| 4,844,162 | 7/1989 | Maassen et al. | 60/641.2 |

FOREIGN PATENT DOCUMENTS 0108547  7/1982  Japan ................................. 60/641.2

Primary Examiner—Allen M. Ostrager
Attorney, Agent, or Firm—Sandler, Greenblum & Bernstein

[57] ABSTRACT

Spent geothermal fluid from a geothermal power plant comprises geothermal vapor in the form of steam and non-condensable gases, and geothermal liquid in the form of mineral-rich brines. A silencer, which receives the spent geothermal fluid, includes a chamber for receiving the spent fluid and which has a lower outlet from which the brine flows. The chamber has an upper outlet through which the geothermal vapor flows. A heat exchanger is connected to the upper outlet, the heat exchanger having a first portion for receiving the geothermal vapor and the second portion containing a working fluid that is vaporized by the heat contained in the geothermal vapor. As a result, the cooled geothermal vapor produces a low pH condensate and non-condensable gases in the first portion. The brines exiting the silencer through the lower outlet are combined with the low pH condensate and with the non-condensable gases to form waste fluid which may be disposed of by injection into a reinjection well.

24 Claims, 2 Drawing Sheets

SILENCER FOR GEOTHERMAL POWER PLANT AND METHOD FOR USING THE SAME

DESCRIPTION

1. Technical Field

This invention relates to a silencer for a geothermal power plant, and to a method for using the same in a way that is ecologically acceptable.

2. Background of Invention

Many geothermal power plants in the United States and elsewhere in the world operate on open cycles by which spent steam and non-condensable gases, such as hydrogen sulfide, carbon dioxide, ammonia, etc., contained in the geothermal fluid produced by a production well are vented directly into the atmosphere. In addition to releasing noxious gases into he atmosphere, the plants utilize surface disposal of silica-rich brines that are the end product of the geothermal fluid used in the power plant. Consequently, operation of conventional geothermal power plants is often ecologically damaging.

A typical, conventional open cycle geothermal power plant is illustrated schematically in FIG. 1. Such power plant comprises a production well producing a mixture of saturated steam and hot brine, typically at 400° F. and at 60 psia, the mixture being applied to a separator which separates the saturated steam and non-condensable gases from the geothermal liquid.

The saturated steam and non-condensable gases produced by the separator in FIG. 1 are supplied to a turbogenerator which extracts heat from the steam and produces power. The heat-depleted steam exhausted from the turbine is condensed in a condenser supplied with cooling water from a cooling tower to which exhaust steam from the turbine is supplied. As a consequence, water vapor and non-condensable gases are vented to the atmosphere. The hot brine produced by the separator rich in minerals such as silica, is collected and conveyed to a storage area by conduits. All the noxious gases contained in the portion of the geothermal mixture directed by the separator to the turbogenerator are released to the atmosphere.

U S. Pat. No. 4,542,625 discloses a method for reducing atmospheric contamination by cooling the condenser and pumping the condensate and non-condensable gases in the condenser into a re-injection well. Thus, all of the extracted geothermal fluid is returned to the ground; and the environment against the release of noxious gases and the necessity for surface storage of mineral-rich brines.

The geothermal liquid produced by the separator in FIG. 1 is supplied to a flash separator producing a mixture of steam and hot geothermal fluid, typically at about 20 psi, and 300° F. The steam is supplied to a conventional steam turbine which exhausts into a condenser cooled by water supplied by a cooling tower associated with the exhaust steam. The spent but still hot and pressurized geothermal fluid is vented directly to the atmosphere; and a portion of the liquid flashes into steam. The flashing of the fluid creates a great deal of noise and produces a vapor plume containing steam, water droplets, and non-condensable gases. Conventionally, noise suppression is achieved by passing the spent fluid through a silencer which is usually a concrete chamber containing a plurality of vapor outlets, each of which is connected to a vertical stack, usually of Fiberglas. Furthermore, silencers are used in the regulation of pressure in steam transport systems as well as being used in suppressing noise generated from geothermal fluid and liquid flow. While silencers abate some of the noise, the vapor plume contains noxious gases whose release into the atmosphere is undesirable. In addition, concentrated, silica-rich brine is produced at the lower outlet of the silencer; and this brine must be disposed of.

It is therefore an object of the present invention to provide a new and silencer, and a method for using the same, which both reduces noise and permits noxious gases contained in geothermal mixtures conventionally used in a geothermal power plant to be disposed of in an ecologically acceptable manner.

BRIEF DESCRIPTION OF THE INVENTION

The present invention provides for improved operation of an open cycle geothermal power plant of the type having a silencer in the form of a base, and a stack for disposing of hot geothermal fluid comprising hot geothermal vapor and hot geothermal brine. The geothermal vapor includes steam and non-condensable gases that pass through the stack and are vented to the atmosphere, the brine passing through the base of the silencer and being directed to a surface stream. The method of the invention comprises the steps of diverting the geothermal vapor from the stack to a heat exchanger, preferably in the form of a tube-and-shell heat exchanger containing a working fluid that absorbs heat from the geothermal vapor and is converted thereby to a vaporized working fluid. The heat given up by the geothermal vapor produces a low pH condensate and non-condensable gases. The heat exchanger is preferably constructed from materials such as stainless steel, etc. which exhibit substantially non-corrosive behavior in relation to the geothermal vapor.

The vaporized working fluid is used for producing power; and the condensate and non-condensable gases produced by the heat exchanger are combined with the geothermal brine to form a waste fluid. Preferably, the waste fluid is injected into a reinjection well.

Power is produced using the vaporized working fluid by the steps of expanding the vaporized working fluid in a turbogenerator to produce heat-depleted working fluid, condensing the heat-depleted working fluid into condensed working fluid, and returning the condensed working fluid to the heat exchanger.

The working fluid may be an organic fluid, or water.

BRIEF DESCRIPTION OF THE DRAWINGS

Embodiments of the present invention are shown by way of example in the accompanying drawings, wherein.

DETAILED DESCRIPTION

Figure 1:
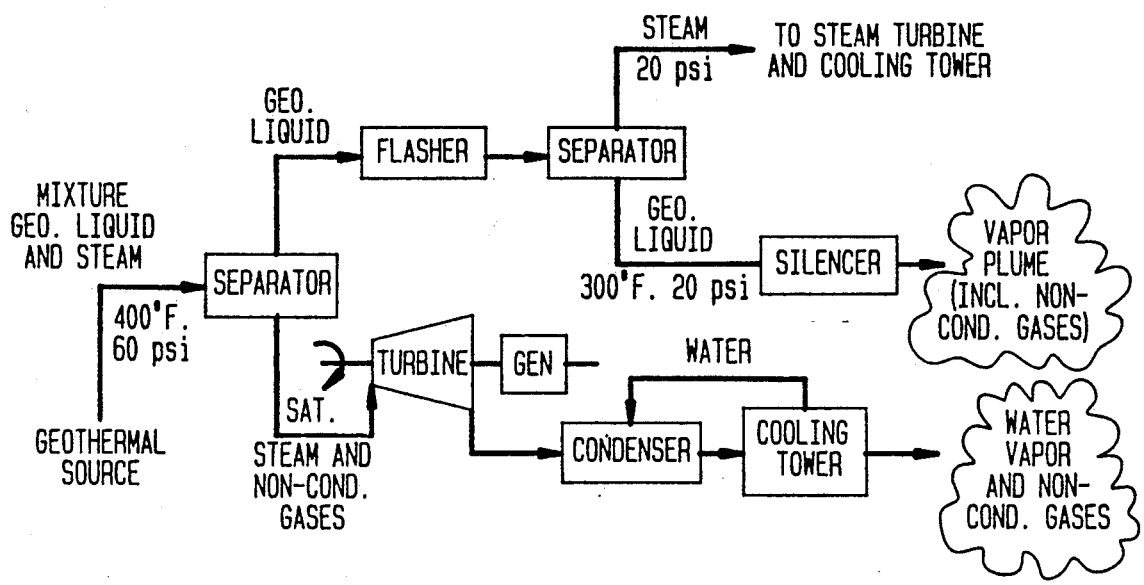
FIG. 1 is a schematic block diagram representing a conventional open cycle geothermal power plant.
Figure 2:
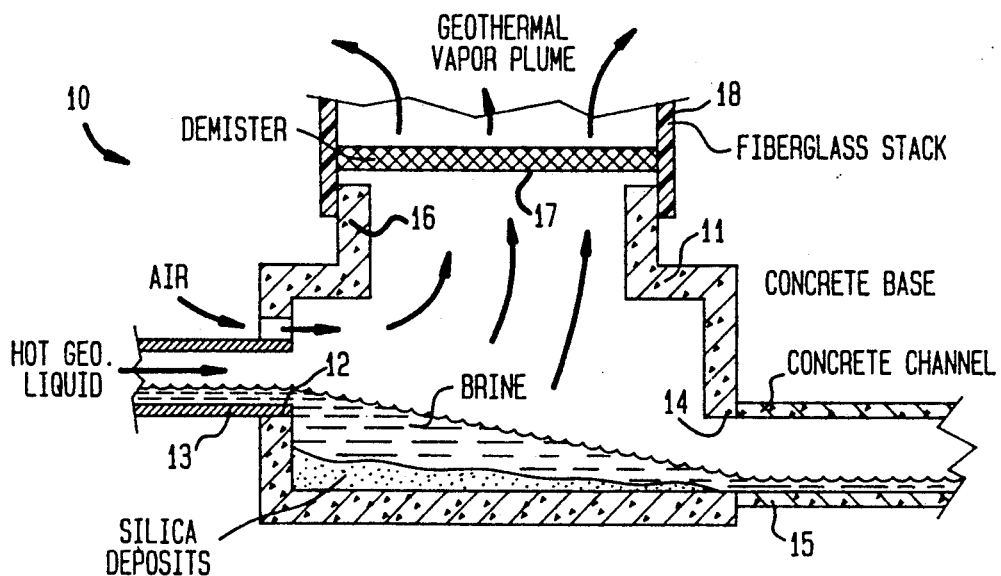
FIG. 2 is a sectional elevation of a silencer according to the prior art for use with the power plant shown schematically in FIG. 1.

Referring now to FIG. 2 of the drawings, reference numeral 10 designates a conventional silencer suitable for use in a conventional open-cycle geothermal power plant for example which is shown schematically in FIG. 1. Silencer 10 comprises concrete chamber 11 having inlet 12 connected to conduit 13 by which hot geothermal liquid, rich in minerals, conveyed from the power plant to the silencer. The hot liquid, typically at 300° F. and 20 psia, flows into chamber 11 where expansion to atmospheric pressure takes place causing some of the water in the liquid to flash into steam and release non-condensable gases. Such expansion is accompanied by loud sounds which are suppressed by the silencer.

The fluid flow into the silencer draws in outside air as indicated, and the chamber is filled with a mixture of air, droplets of brine and water, steam, and non-condensable gases. The liquid inside the silencer produced as a consequence of the flashing, is more concentrated than the inflowing fluid, and flows on the bottom of the chamber to lower outlet 14 connected to concrete channel 15 for conveying the concentrated brine to a reservoir.

Some of the minerals in the brine precipitate in the bottom of the silencer by reason of the increase in concentration that occurs on flashing of the brine. Additional precipitation occurs in channel 15 as the brine flowing therein cools on its way to the storage reservoir. This necessitates periodic cleaning of the channel to prevent blockage.

Chamber 11 also includes upper outlet 16 through which the air, liquid droplets, steam, and non-condensable gases pass. Demister 17 covering outlet 16 separates droplets from the upwardly-flowing mass, permitting essentially air, steam and non-condensable gases to pass upwardly through vertical stack 18 which is usually of Fiberglas. The result is a geothermal plume which rises above the silencer and which contains steam, water droplets, carbon dioxide, hydrogen sulfide and other noxious gases. The height of the plume results in a wide geographic distribution of undesirable gases that contribute, among other things, to acid rain over a wide area adjacent the geothermal power plant. The present invention eliminates the release of such material to the atmosphere by silencers of this or similar type.

Figure 3:
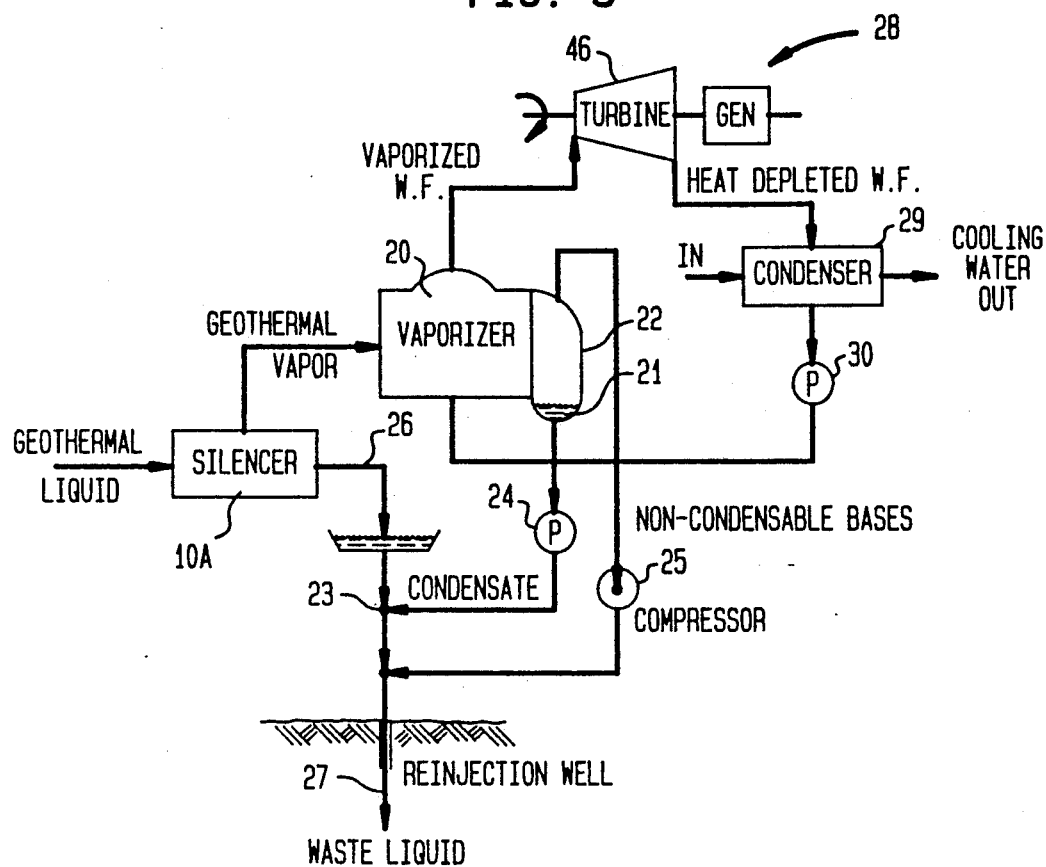
FIG. 3 is a block diagram of a silencer and power plant constructed in accordance with the present invention.

Turning now to FIG. 3, which shows the present invention, reference numeral 10A represents a silencer similar to silencer 10 shown in FIG. 2. Instead of utilizing stack 18 for the purpose of conveying the air, steam and non-condensable gas mixture in the chamber to the atmosphere as shown in FIG. 2, silencer 10A diverts the geothermal vapor into heat exchanger 20. Heat exchanger 20 is preferably constructed from materials such as stainless steel, etc. which exhibits substantially non-corrosive behavior to the geothermal vapor. This heat exchanger has a first portion for receiving the geothermal vapor, and a second portion containing a working fluid that is vaporized by the heat contained in the geothermal vapor. The heat transferred from the geothermal vapor causes the condensables in the geothermal vapor to condense, producing a liquid which absorbs some of the gases. The result is a low pH condensate in sump 21 of the heat exchanger. Above the condensate in sump 21 is space 22 containing the non-condensable gases in the geothermal vapor.

Combining means in the form of connection 23 and pump 24 are provided for combining brine in conduit 26 exiting silencer 10A with the low pH condensate from sump 21 for forming a waste liquid that is piped to reinjection well 27 and disposed of therein. Preferably, the non-condensable gases in space 22 of the heat exchanger are compressed by compressor 25 and also combined with the waste liquid for disposal in the rejection well.

The presence of the low pH condensate produced by heat exchanger 20 in the mineral-rich brines that exit silencer 10A reduces the amount of mineral precipitation from the cooled brines in the conduits leading to the reinjection well. This has the beneficial result of reducing the fouling by precipitates, primarily silica, of the various piping associated with the reinjection well.

Working fluid contained in heat exchanger 20, which may be an organic fluid or water, is vaporized in the heat exchanger and is supplied to turbogenerator 28 for the purpose of generating power and producing heat-depleted working fluid which is supplied to condenser 29. In the condenser, the heat-depleted working fluid is condensed and returned by pump 30 to heat exchanger 20 in order for the cycle to repeat. Condenser 29 is cooled preferably by suitable cooling water.

Figure 4:
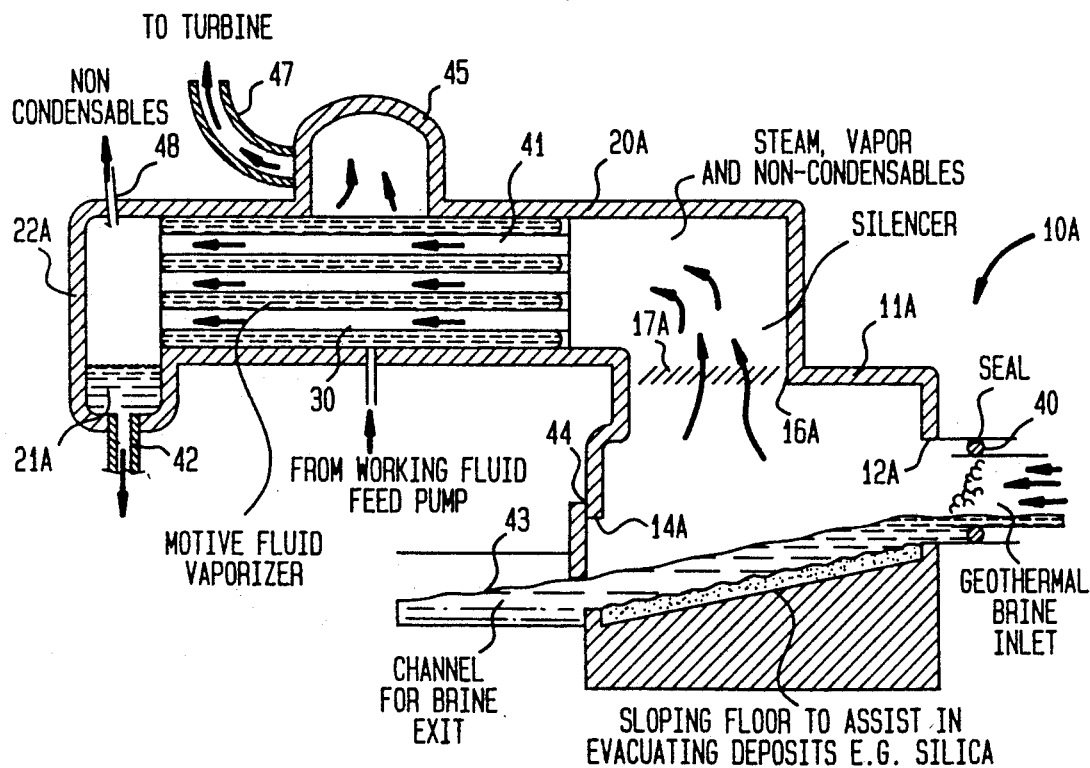
FIG. 4 is an elevation side view in section of a silencer according to the present invention.

The preferred form of heat exchanger 20 is illustrated in FIG. 4 which shows conventional chamber 11A of silencer 10A in accordance with the present invention. Specifically, the inlet to chamber 11A is sealed by seals 40 to reduce the inflow of ambient air as compared to a conventional silencer as shown in FIG. 2. Thus, the hot geothermal fluid flows into chamber 11A, and the gaseous components, which entrain droplets of liquid water and brine, flow upwardly and outwardly through outlet 16A. After engaging demister 17A, the steam, vapor and non-condensable gases are applied to the inside of tubes 41 of tube-and-shell heat exchanger 20A which, preferably, is mounted with the tubes horizontally disposed.

The gaseous constituents flowing through tubes 41 in the heat exchanger give up heat to a working fluid outside the tubes. The working fluid is vaporized as a consequence of the heat transfer action along the length of the tubes. At the outlet end of the tubes is header 22A having sump 21A at its lower end. Header 22A contains essentially noncondensable gases; and sump 21A contains low pH condensate. The liquid condensate is extracted via conduit 42 to pump 24 for the purpose of injecting this condensate into reinjection well 27 in combination with brine 43 that passes through outlet 14A in chamber 11A. Also, floor 19 of chamber 11A is sloped relative to the horizontal in order to assist in minimizing collection of deposits such as silica, etc. in the chamber.

The size of outlet 14A is controlled by adjustable shutter 44 consistent with the rate of flow of brine 43. Shutter 44 reduces the flow of ambient air into the interior of the chamber.

The working fluid exterior to tubes 41 may be water, or an organic fluid which is vaporized as a consequence of the heat transfer between the steam, vapor and non-condensables flowing inside tubes 41. Heat exchanger 20A is provided with central dome 45 that serves as a header to collect vaporized working fluid which is transferred, via conduit 47, to turbine 46 of turbogenerator 28. Non-condensable gases in header 22A are vented at 48 to compressor 25.

The advantages and improved results furnished by the method and apparatus of the present invention are apparent from the foregoing description of the preferred embodiment of the invention. Various changes and modifications may be made without departing form the scope of the invention as descried in the appended claims.

I claim:

1. A method for improving the operation of an open cycle geothermal power plant of the type having a silencer in the form of a base, and a stack for disposing of hot geothermal fluid comprising hot geothermal vapor and hot geothermal brine, the geothermal vapor including steam and non-condensable gases that pass through the stack and are vented to the atmosphere, the brine passing through the base of the silencer and being directed to a surface stream, said method comprising the steps of:
   (a) diverting the geothermal vapor from the stack to a tube-and-shell heat exchanger containing a working fluid that absorbs heat from the geothermal vapor and is converted thereby to a vaporized working fluid, the heat given up by the geothermal vapor producing a low pH condensate and non-condensable gases;
   (b) producing power using the vaporized working fluid; and
   (c) combining the condensate and non-condensable gases produced by the heat exchanger with the geothermal brine to form a waste fluid.

2. A method according to claim 1, including the additional step of injecting said waste fluid into a reinjection well.

3. A method according to claim 2, wherein power is produced using said vaporized working fluid by the steps of expanding the vaporized working fluid in a turbogenerator to produce heat-depleted working fluid, condensing the heat-depleted working fluid into condensed working fluid, and returning the condensed working fluid to the heat exchanger.

4. A method according to claim 3, wherein the working fluid is an organic fluid.

5. A method according to claim 3, wherein the working fluid is water.

6. A method for reducing precipitation of minerals in geothermal brine utilizing geothermal fluid containing steam, non-condensable gases and brine containing dissolved minerals, said method comprising the steps of:
   (a) separating said geothermal fluid into a first stream that includes steam and non-condensable gases, and a second stream that includes said brine;
   (b) extracting heat from said steam in the presence of said non-condensable gases to condense the steam and produce a low pH condensate and non-condensable gases;
   (c) combining said condensate with said brine; and
   (d) using the extracted heat to generate power.

7. A silencer for a geothermal power plant that produces spent geothermal fluid comprising geothermal vapor in the form of steam and non-condensable gases, and geothermal liquid in the form of mineral-containing brines, said silencer comprising:
   (a) a chamber for receiving said spent geothermal fluid and having a lower outlet into which said brines flow, and having an upper outlet into which said geothermal vapor flows; and
   (b) a heat exchanger connected to the upper outlet, said heat exchanger having a first portion for receiving said geothermal vapor, and a second portion containing a working fluid that is vaporized by the heat contained in said geothermal vapor which condenses as a result producing a low pH condensate, and non-condensable gases in said first portion.

8. A silencer according to claim 7, including generating means responsive to vaporized working fluid for generating power.

9. A silencer according to claim 8, wherein said generating means includes a turbogenerator responsive to said vaporized working fluid for producing power and heat-depleted working fluid, a condenser for condensing said heat-depleted working fluid into working fluid condensate, and means for returning said working fluid condensate to said heat exchanger.

10. A silencer according to claim 7, wherein said heat exchanger has a tube-and-shell configuration, said first portion being inside of the tubes.

11. A silencer according to claim 10 wherein said tubes are horizontally disposed.

12. A silencer according to claim 7 including combining means for combining the brine exiting said lower outlet with said low pH condensate to form waste liquid.

13. A silencer according to claim 12, wherein said combining means is constructed and arranged to inject said waste liquid into a re-injection well.

14. A silencer according to claim 12, wherein said combining means is constructed and arranged to extract non-condensable gases from the first portion of said heat exchanger, and to inject the extracted gases into a re-injection well.

15. A silencer for use with geothermal fluid comprising geothermal vapor in the form of steam and noncondensable gases, and geothermal liquid in the form of mineral-containing brines, said silencer comprising:
   (a) a chamber for receiving said geothermal fluid and having a lower outlet into which said brines flow, and having an upper outlet into which said geothermal vapor flows; and
   (b) a heat exchanger connected to the upper outlet, said heat exchanger having a first portion for receiving said geothermal vapor, and a second portion containing a working fluid that is vaporized by the heat contained in said geothermal vapor which condenses as a result producing a low pH condensate, and non-condensable gases in said first portion.

16. A silencer according to claim 15 including combining means for combining the brine exiting said lower outlet with said low pH condensate to form waste liquid.

17. A silencer according to claim 15, including generating means responsive to vaporized working fluid for generating power.

18. A silencer according to claim 17, wherein said generating means includes a turbogenerator responsive to said vaporized working fluid for producing power and heat-depleted working fluid, a condenser for condensing said heat-depleted working fluid into working fluid condensate, and means for returning said working fluid condensate to said heat exchanger.

19. A silencer according to claim 16, wherein said combining means is constructed and arranged to inject said waste liquid into a re-injection well.

20. A silencer according to claim 16, wherein said combining means is constructed and arranged to extract non-condensable gases from the first portion of said heat exchanger, and to inject the extracted gases into a re-injection well.

21. A silencer according to claim 15, wherein said heat exchanger has a tube-and-shell configuration, said first portion being inside of the tubes.

22. A silencer according to claim 21 wherein said tubes are horizontally disposed.

23. A silencer according to claim 15 wherein said heat exchanger is constructed from non-corrosive material.

24. A silencer according to claim 15 wherein said heat exchanger is constructed from stainless steel.

* * * * *